US009240985B1

(12) United States Patent  
Potakamuri et al.

(10) Patent No.: US 9,240,985 B1  
(45) Date of Patent: Jan. 19, 2016

(54) METHOD AND SYSTEM FOR MANAGING ACCESS TO STORAGE SPACE IN STORAGE SYSTEMS

(75) Inventors: Sreenivasa Potakamuri, Sunnyvale, CA (US); Yinzen Hwang, Fremont, CA (US); Faina Prager, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 246 days.

(21) Appl. No.: 13/587,163

(22) Filed: Aug. 16, 2012

(51) Int. Cl.  
*H04L 29/06* (2006.01)  
*G06F 21/31* (2013.01)

(52) U.S. Cl.  
CPC ............... *H04L 63/08* (2013.01); *G06F 21/31* (2013.01)

(58) Field of Classification Search  
CPC .......... H04L 63/10; H04L 63/08; G06F 21/31  
USPC ............... 726/3–5, 7, 18; 713/172–174, 186; 382/115  
See application file for complete search history.

(56) References Cited

U.S. PATENT DOCUMENTS

| 8,417,678 | B2* | 4/2013 | Bone ................ G06F 17/30221 707/694 |
| 2003/0055943 | A1* | 3/2003 | Kanai ........................... 709/223 |
| 2004/0030700 | A1* | 2/2004 | Hakamata ......................... 707/9 |
| 2004/0250129 | A1* | 12/2004 | Clough ................... H04L 63/08 726/4 |
| 2005/0044426 | A1* | 2/2005 | Vogel ................. G06F 21/6218 726/19 |
| 2005/0187937 | A1* | 8/2005 | Kawabe et al. .................... 707/9 |
| 2005/0278422 | A1* | 12/2005 | Prust ................. G06F 17/30067 709/203 |
| 2006/0020818 | A1* | 1/2006 | Mizuno ......................... 713/182 |
| 2006/0282660 | A1* | 12/2006 | Varghese et al. ............... 713/155 |
| 2007/0136802 | A1* | 6/2007 | Matoba ............... H04L 63/0245 726/11 |
| 2007/0192561 | A1* | 8/2007 | Satoyama ............. G06F 3/0614 711/170 |
| 2008/0183994 | A1* | 7/2008 | Maki .................... G06F 3/0607 711/162 |
| 2010/0115586 | A1* | 5/2010 | Raghavan et al. ................ 726/3 |
| 2010/0125587 | A1* | 5/2010 | Matsui et al. ................. 707/752 |
| 2013/0212576 | A1* | 8/2013 | Huang et al. ...................... 718/1 |
| 2013/0254326 | A1* | 9/2013 | Weng ................... G06F 9/5072 709/215 |

OTHER PUBLICATIONS

Fay Chang et al., Bigtable: A Distributed Storage System for Structured Data, Jun. 2008, ACM, vol. 26 Issue 2, pp. 1-26.*  
Kui Ren et al., A Novel Privacy Preserving Authentication and Access Control Scheme for Pervasive Computing Environments, Jul. 2006, IEEE, vol. 55 Issue 4, pp. 1373-1384.*  
L. Harn et al., Integration of user authentication and access control, Mar. 1992, IEEE, vol. 139 Issue 2, pp. 139-143.*  
Anthony Harrington et al., Cryptographic Access Control in a Distributed File System, Jun. 2003, ACM, pp. 158-165.*

* cited by examiner

*Primary Examiner* — Luu Pham  
*Assistant Examiner* — Fahimeh Mohammadi  
(74) *Attorney, Agent, or Firm* — Gilliam IP PLLC (57) ABSTRACT

Method and system for managing access to storage space are provided. A plurality of client computing systems interfaces with a management console for accessing storage space at a plurality of storage devices managed by a plurality of storage servers that also interfaces with the management console. The management console is configured to receive a request from a client computing system to access a storage volume or to obtain information regarding the storage volume, validate the request by verifying a client computing system identity with a domain controller, store validation result in an access control data structure at a memory storage device; and use the validation result to either accept or reject any future client computing system request for accessing another storage volume without having to validate the future requests with the domain controller.

18 Claims, 6 Drawing Sheets

FIG. 1A

| Access Control Data Structure 128 ||||
| Storage System Identifier 128A | Access Object Identifier 128B | Client ID 128C | Validity Indicator 128D |
| --- | --- | --- | --- |
| SSID1 | V1 | C1 | Yes |
| SSID1 | V2 | C2 | Yes |
| SSID1 | • | • | • |
| SSID1 | • | • | • |
| SSID1 | • | • | • |
| • | • | • | • |
|  |  |  |  |
|  |  |  |  |
|  |  |  |  |
|  |  |  |  |
| • | • | • | • |
| • | • | • | • |
| SSIDN | • | • | • |

METHOD AND SYSTEM FOR MANAGING ACCESS TO STORAGE SPACE IN STORAGE SYSTEMS

TECHNICAL FIELD

The present disclosure relates to storage systems and more particularly managing access to storage space in the storage systems.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. From the perspective of a client computing system each storage volume can appear to be a single storage device. However, each storage volume can represent storage space in one storage device, an aggregate of some or all of the storage space in multiple storage devices.

In conventional systems, storage servers typically maintain access control lists (ACLs) for controlling access to storage volumes/storage space. Before a client computing system is allowed to access storage space, a storage server typically validates client identification information with a domain controller. This approach has drawbacks, especially when there are a large number of client computing systems that may request access to storage space at any given time via a management console. The management console has to forward each request to the storage operating system. The storage operating system may have to forward each request to the domain controller for validation. After receiving a response from the domain controller, the storage operating system sends a response to the management console that forwards the response to respective client computing systems. This process is inefficient because various modules have to interact before a client request can be processed. Continuous efforts are being made to efficiently process client requests.

SUMMARY

In one embodiment, a system for managing access to storage space is provided. A plurality of client computing systems interface with a management console for accessing storage space at a plurality of storage devices managed by a plurality of storage servers that also interface with the management console. The management console is configured receive a request from a client computing system to access a storage volume or to obtain information regarding the storage volume, validate the request by verifying a client computing system identity with a domain controller, store validation result in an access control data structure at a memory storage device; and use the validation result to either accept or reject any future client computing system requests without having to validate the future requests with the domain controller.

In another embodiment, a machine implemented method is provided. The method includes maintaining an access control data structure at a cached memory of a management console interfacing with a plurality of computing systems and a plurality of storage systems, where the plurality of storage systems manage storage devices and present storage space to the plurality of client computing systems; and receiving a request by the management console from a computing system to access a storage volume maintained by a storage system or to obtain information regarding the storage volume. The management console uses the access control data structure to determine if an identity of the computing system has previously been validated; and grants the request using the access control data structure, when the computing system identity has previously been validated.

The method further includes validating the computing system identity, after verifying that the computing system identity has previously not been validated; updating the access control data structure with validation results, after validating the computing system identity; and using the updated access control data structure for granting any future request from the computing system.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system for managing access to storage space is provided. A plurality client computing systems interface with a management console for accessing storage space at a plurality of storage devices managed by a plurality of storage servers that also interface with the management console. The management console is configured to receive a request from a client computing system to access a storage volume or to obtain information regarding the storage volume, validate the request by verifying a client computing system identity with a domain controller, store validation result in an access control data structure at a memory storage device; and use the validation result to either accept or reject any future client computing system request for accessing another storage volume without having to validate the future requests with the domain controller.

Figure 1A:
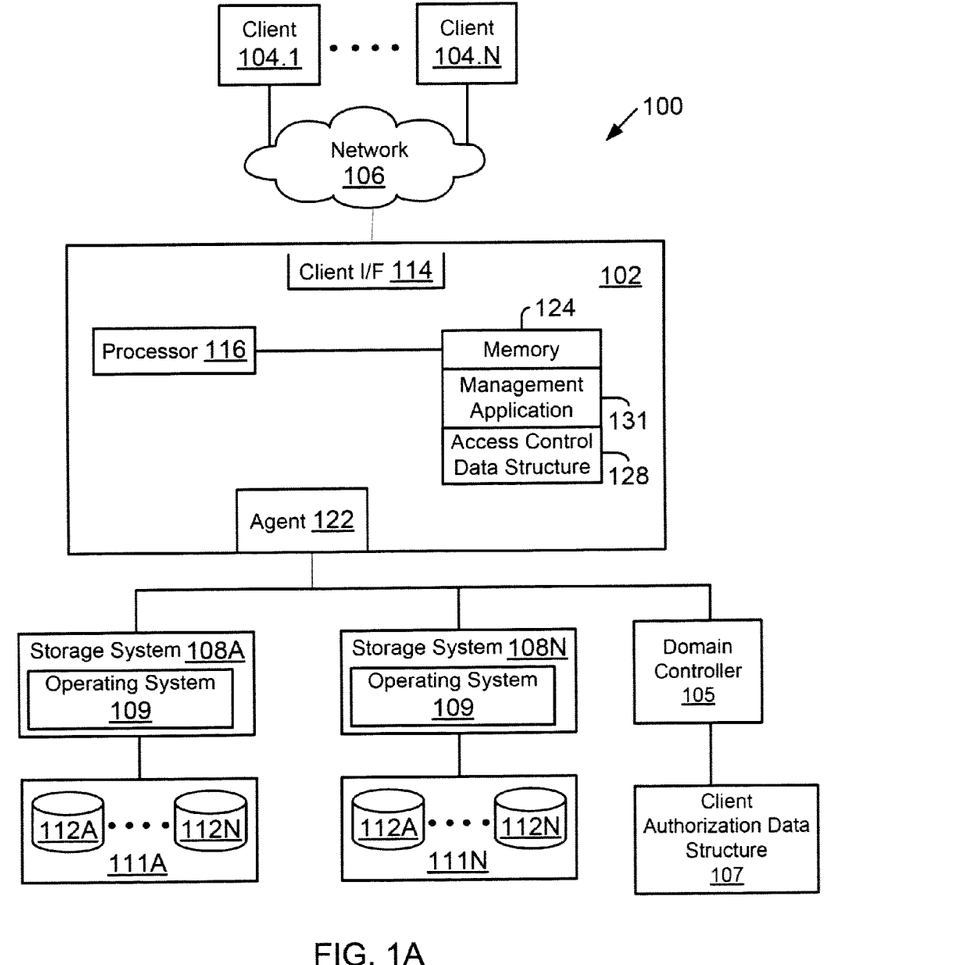
FIG. 1A shows an example of a storage environment using a plurality of storage systems, according to one embodiment.

Storage Environment 100:

FIG. 1A depicts a storage environment 100 (may also be referred to as system 100) for implementing the embodiments disclosed herein. Storage environment 100 may include a plurality of client computing systems 104.1-104.N (may also be referred to as client 104 or clients 104) interfacing with a plurality of storage systems (may also be referred to as storage servers) 108A-108N (may be referred to as storage system 108 or storage systems 108) via a management console 102 and at least one network 106 that may be a local area network (LAN), wide area network (WAN), the Internet or any other connection type.

In one embodiment, system 100 may also include a domain controller 105 that maintains a client authorization data structure 107 (may be referred to as data structure 107) for storing authentication information for client computing systems 104 to access storage space managed by the storage systems 108. The domain controller 105 may be a stand-alone authentication server.

Data structure 107 stores identification information for the client computing systems 104 and the associated permissions for each computing system. As described below in detail, the data structure 107 may be used to validate a client request before a client is granted access or permission to read and/or write information. In one embodiment, the data structure 107 is maintained by network administrator that stores identifiers for uniquely identifying client computing systems and permissions associated with each identifier. The permissions refer to the ability of a client computing system to read and/or write information at a storage space presented to a client computing system 104 by storage system 108.

Different protocols or techniques may be used to validate client (or user) requests and for storing data structure 107, for example, the Light Directory Access Protocol (LDAP) may be used by the domain controller 105 store data structure 107 for validating client requests. LDAP directory typically stores information as nodes with various attributes. For example, information for a particular user may be stored as a node in data structure 107 with various attributes. The attributes may include information regarding a user/client that can be used to authenticate a user/client. For example, an LDAP node may store a user identifier (user ID), a group identifier, if the user is part of a group, a login shell of the user, a password, permission type and other fields. Typically, the LDAP directory is stored at a LDAP server example, domain controller 105) and operates in a client/server model. The domain controller 105 receives a request from an entity (for example, storage system 108A-108N) and the domain controller 105 responds to the request. Details regarding using data structure 107 are provided below.

Management console 102 may include a client interface 114 to communicate with client computing systems 104. Client interface 114 includes logic/circuitry for receiving and parsing client requests and forwarding the client requests to an appropriate module of management console 102. Client interface 114 may also be used to send information to clients 104 in response to client requests or otherwise.

Management console 102 may also execute an agent 122 for communicating with storage systems 108 as well as the domain controller 105. As an example, agent 122 may be a SMIS (Storage Management Initiative Specification) agent based on the SMIS standard provided by the Storage Network Industry Association (SNIA). SMIS is intended to facilitate management commands between a management console and servers/computing systems. Agent 122 includes instructions and logic for sending information to storage systems 108/ domain controller 105 and receiving information from the storage systems 108 and the domain controller 105. It is noteworthy that the embodiments disclosed herein are not limited to any specific format/structure of agent 122.

In one embodiment, management console 102 may also include a processor 116 and a memory 124. Processor 116 may include one or more programmable general-purpose or special-purpose microprocessors, digital signal processors (DSPs), programmable controllers, application specific integrated circuits (ASICs), programmable logic devices (PLDs), or the like, or a combination of such hardware based devices. Memory 124 represents any form of random access memory (RAM), read-only memory (ROM), flash memory, or the like, or a combination of such devices In one embodiment, processor 116 executes a management application 131 out of memory 124. The management application 131 may be used to configure various components' of system 100 and to interface with storage systems 108 and client computing systems 104. Memory 124 may be used as a cache for storing a plurality of data structures, for example, an access control data structure 128 and other data structures. The cached access control data structure 128 is used for managing access to storage space as well as for providing information related to client access as described below in detail.

Client computing systems 104 as described below in more detail may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Client computing systems 104 use storage systems 108 to read and write information. Each storage system 108 may include or has access to a storage subsystem 111 (shown as 111A-111N) having multiple mass storage devices 112A-112N (may also be referred to as storage device 112 or storage devices 112). The storage devices 112 may be, for example, conventional magnetic disks, optical disks such as CD-ROM or DVD based storage, magneto-optical (MO) storage, flash based storage devices or any other type of non-volatile storage devices suitable for storing structured or unstructured data.

The storage systems 108 execute a storage operating system 109 for managing storage space within storage subsystem 111 and presenting storage space to clients 104. As an example, storage operating system 109 maybe the DATA ONTAP® storage operating system, available from NetApp®, Inc., that implements a Write Anywhere File Layout (WAFL®) storage system, or any other suitable storage operating system.

Storage operating system 109 and applications running on the client computing systems 104 communicate according to well-known protocols, such as the NFS (Network File System) protocol or the CIFS (Common Internet File System) protocol, to make data stored on storage devices 112 appear to users and/or application programs as though the data were stored locally on the client computing systems 104.

Storage operating system 109 presents or exports data stored at storage devices 112 as a storage volume (may also be referred to as a volume) to client computing systems 104. In one embodiment, a storage volume is a logical data set which is an abstraction of physical storage, combining one or more physical mass storage devices or parts thereof into a single logical storage object. Each storage volume is identified by a unique identifier by the storage system that presents the storage volume.

A storage volume may be configured to store data containers, scripts, word processing documents, executable programs and any other type of structured or unstructured data. The term data container as used herein means a block, a file, a logical unit of data or any other information. Each storage volume can represent storage space in one storage device, an aggregate of some or all of the storage space in multiple storage devices, a RAID (redundant array of inexpensive disks) group, or any other suitable set storage space. An aggregate of storage space is identified by a unique identifier by each storage system 108 that manages the aggregate.

The storage systems 108 also present one or more logical unit numbers (LUNs) to client computing systems 104 for storing information. Each LUN is uniquely identified by the storage system that presents the LUN. Each LUN identifies a specific logical unit, which may be a part of a storage device, an entire storage device or several storage devices. Each LUN is associated with the storage volume that is presented to the client computing systems.

In a typical mode of operation, one of the client computing systems 104 transmits one or more I/O (input/output) commands, such as an NFS or CIFS request, over network 106 to one of the storage systems 108. The storage system 108 issues one or more I/O commands to one of the storage devices 112 to read or write the data on behalf of the client computing system. The storage system 108 also issues an NFS or CIFS response containing the requested data over network 106 to the client computing system 104.

It is noteworthy, in one embodiment system 100 may also include a virtual machine environment (not shown) where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In the virtual machine environment, typically, a virtual machine monitor (VMM), for example, a processor executed hypervisor layer provided by VMWare Inc., Hyper-V layer provided by Microsoft Corporation of Redmond, Wash. or any other layer type, presents and manages the plurality of guest OS that may be executed by a computing system, for example, client computing system 104. The term client computing system and virtual machines may be used interchangeably, throughout this specification.

In conventional systems, the storage systems 108 typically maintain access control lists (ACLs) for controlling access to LUNs and storage volumes. Before a user is allowed to access storage space or obtain information regarding the storage space, the storage systems 108 validate user identification information with the domain controller 105. The ACLs maintained by the storage systems 108 typically include client computing system identifiers, identifiers identifying the storage space that the client computing systems are permitted to access and the nature of the permissions i.e. read only, write only and/or read/write permissions. The permission type is typically setup by a storage administrator using a management console.

The conventional approach has drawbacks especially when there are a large number of client computing systems that may request access to storage space at any given time via a management console. The management console forwards each client request to the storage operating system 109 or a storage system that is managing the storage space. The storage operating system 109 may have to forward each request to the domain controller 105 for validation. After receiving a response from the domain controller 105, the storage operating system 109 sends a response to the management console that forwards the response to the client computing systems. This process is inefficient because various modules i.e. client computing system, management console, storage systems and domain controller have to interact before a client request to access storage can be processed.

Figure 1B:
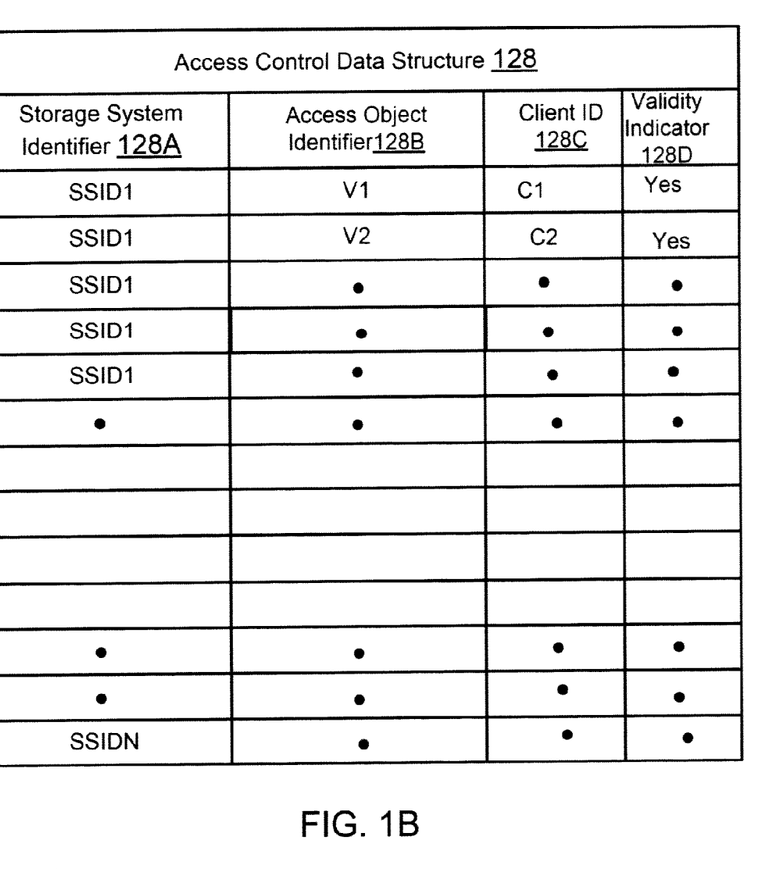
FIG. 1B shows a block diagram of an access control data structure, according to one embodiment.

The embodiments disclosed herein use the access control data structure 128 to provide a more efficient solution by moving the process for validating a client request from the storage systems 108 directly to the management console 102 that directly interfaces with clients 104. FIG. 1B shows an example of the access control data structure 128 having a plurality of fields' 128A-128O, according to one embodiment.

Field 128A identifies the various storage systems 108 that may be managing storage space presented to one or more client computing systems 104. As an example, a first storage system 108A may be identified as SSID1 and so forth. Field 128B is an access object identifier that identifies a storage volume, LUN or a data container that a client computing system 104 is allowed to access. As an example, storage volumes V1 and V2 are shown in FIG. 1B that are accessible to client computing systems identified by C1 and C2 stored as field 128C.

Field 128D stores a validity indicator indicating if a particular client computing system has been validated. Field 128D may include authentication credentials for a client computing system that are used to process client requests. For example, when client C1 has previously been validated for using storage volume V1 then field 128D indicates that client C1 has previously been validated. Field 128D can then be used by management console 102 for processing any future requests involving client C1. For example, if client C1 seeks to obtain details regarding volume V2 and client C1 is authorized to receive the details, then management console 102 does not have to re-validate client C1 and instead can use the validation results stored as indicator 128D. Details regarding the use of field 128D are provided below.

Figure 1C:
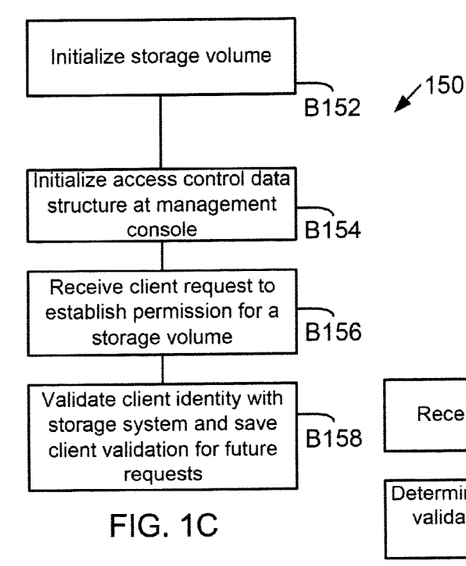
FIGS. 1C and 1D show process flow diagrams, according to one embodiment.

FIG. 10 shows a process 150 for using the access control data structure 128, according to one embodiment. The process begins in block B152, when a storage volume is initialized. The storage volume may be initialized by a storage administrator (Admin) using management application 131. As part of the initialization, management application 131 assigns various attributes to the storage volume. The attributes includes a storage volume identifier, volume size, partitioning and permissions for certain client computing system for accessing the storage volume. Information regarding the storage volume is cached at management console 102 such that management console 102 can respond to any requests regarding the initialized storage volume, as described below.

In block B154, the access control data structure 128 is initialized such that fields' 128A-128D can be assigned for the initialized storage volume. Any ACL with respect to the storage volume maintained by the storage system are obtained by agent 122.

In block B156, a client request is received for permission for a user to access the storage volume initialized in block B152.

In block B158, the management application 131 first validates the client identity. In one embodiment, agent 122 seeks validation from storage operating system 109. The storage system requests the domain controller 105 to verify that user identity is valid. As described above, domain controller 105 maintains information regarding various clients. The client identifier is validated and the validation results (authentication credentials) obtained from the domain controller 105 are then stored as field 128D of the access control data structure 128. It is noteworthy that when data structure 107 is updated with new client information, then the updated information is provided to management console 102 to update access control data structure 107. The validation information can then used by management application 131 to process future client requests to access the storage volume initialized in block B152 or to obtain information regarding the storage volume.

Figure 1D:
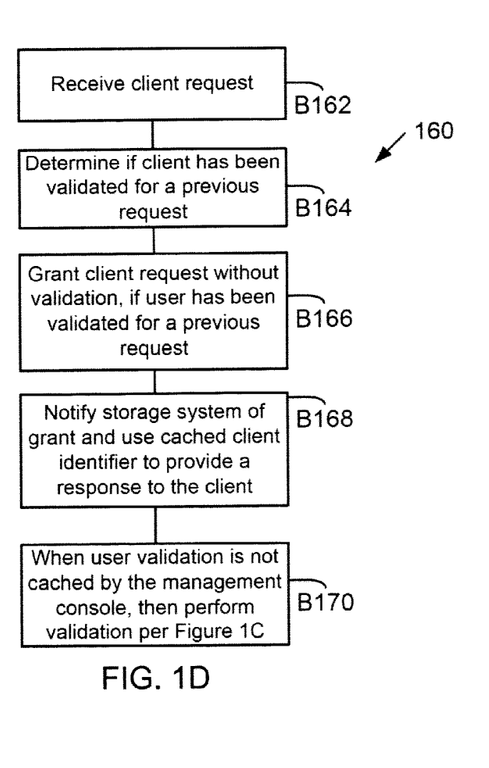

FIG. 1D shows a process 160 for processing client requests. The requests may be for permission to access storage volumes or to obtain information regarding storage volumes. As an example, the requests may be to obtain permission data for a plurality of client computing systems. The permission data may include client identifiers for client computing systems that are permitted to access certain storage volumes, information regarding the permission types and others.

The process begins in block B162, when a client request is received by management application 131. In block B164, the management application 131 verifies if the client has previously been validated. In one embodiment, management application 131 checks field 128D of the access data structure 128 to determine if the client has previously been validated. If the client has been previously validated, then the request is granted in block B166 without re-validating the request or the client computing system identifier. The storage system 108 that manages the storage volume is notified in block B168. The management application 131 uses cached client validation data and client identifier to respond to the client.

If the client has not been validated, then in block B170, the validation process 150 of FIG. 1C is performed.

The embodiments disclosed herein are efficient because the management console that interfaces with the client computing systems can use cached, access control data structure 128 to provide information and grant access, without having to go through a complex process using both the storage system 108 and the domain controller 105.

The following example illustrates the process flow diagram of FIGS. 1C and 1D as well as the use of access control data structure 128, according to one embodiment. At any given instance, agent 122 is initialized and agent 122 requests access control information regarding a storage volume V1 managed by storage system 108A. The storage system 108A maintains access control information regarding all its storage volumes and it provides the access control information to agent 122. As an example, storage system 108A notifies agent 122 that a User B (or client system B) is given read-only access to volume V1, while a user C (or a client system C) is given read-write access.

The Admin may want to obtain all the access con information that management console 102 may have at this instance and management console 102 can use the cached information to provide such information to the Admin. It is noteworthy that Admin may be using any client computing system 104.1-104.N.

A user A (or client system A) then sends a read request to read from storage volume V1. The storage system 108A verifies that user A is valid with domain controller 105 but determines that user A does not have permission to read from storage volume V1. The read request is then denied.

User A then requests the Admin to obtain read-only access too storage volume V1. The Admin notifies management console 102 that it would like to grant read-only access user A to read from storage volume V1. Agent 122 checks access control data structure 107 and determines that permission does not exist but user A is valid, assuming that user A was previously validated.

Agent 122 then contacts storage system 108A to add user A for read-only access to storage volume V1. Storage system 108A adds user A and notifies agent 122. Management console 102 then notifies the Admin who in turn notifies user A. Thereafter, user A is able to access storage volume V1.

Figure 2:
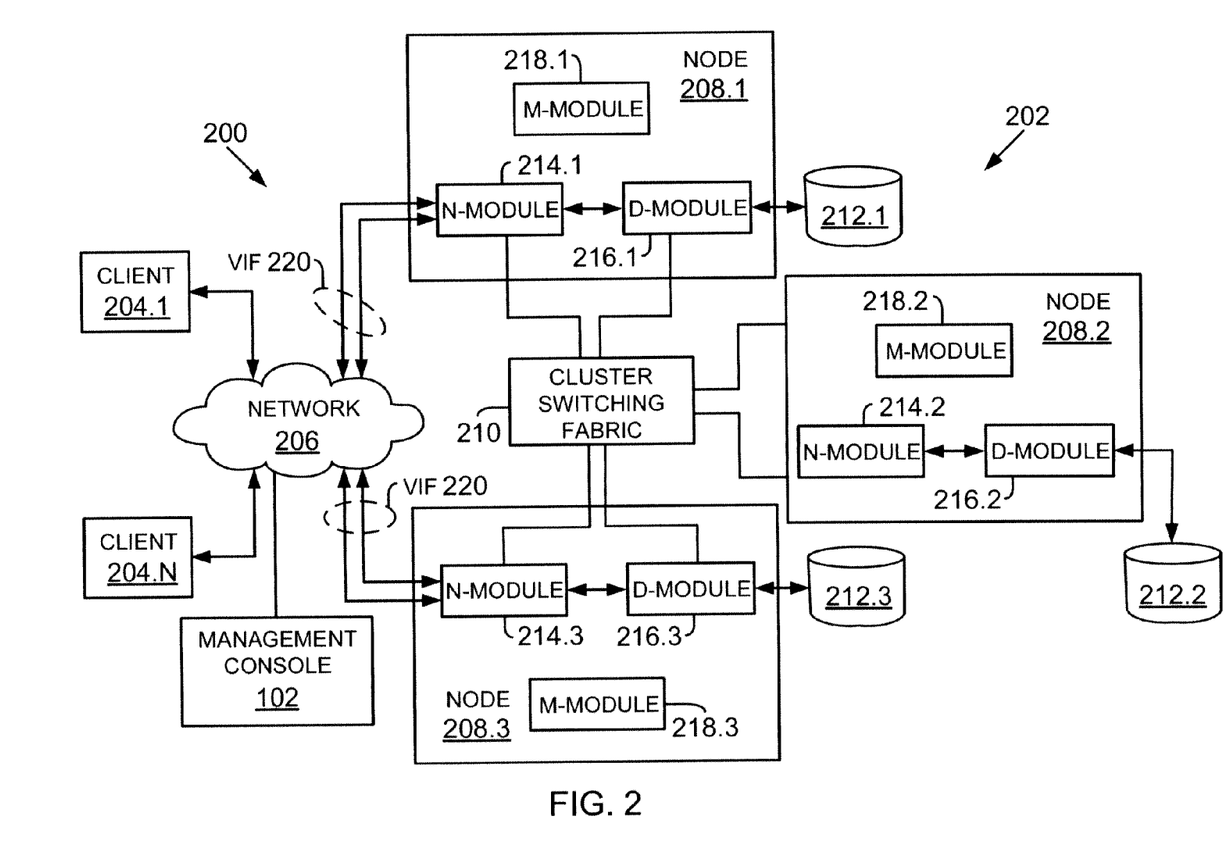
FIG. 2 shows an example a clustered storage environment used according to one embodiment.

Clustered System:

FIG. 2 shows a cluster based storage environment 200 having a plurality of nodes for managing storage devices, according to one embodiment. The process flow of FIGS. 1C and 1D are applicable to the cluster based storage environment 200.

Storage environment 200 may include a plurality of client computing systems 204.1-204.N (similar to 104.1-104.N), a clustered storage system 202, management console 102 and at least a network 206 communicably connecting the client computing systems 204.1-204.N and the clustered storage system 202. As shown in FIG. 2, the clustered storage system 202 includes a plurality of nodes 208.1-208.3, a cluster switching fabric 210, and a plurality of mass storage devices 212.1-212.3 (may be referred to as 212 and similar to storage device 112).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client computing systems 204.1-204.N over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 maintain the access control data structure 128 that is used to gain access to storage space, as described above with respect to FIGS. 1C and 1D.

A switched virtualization layer including a plurality of virtual interfaces (VIFs) 220 is provided to interface between the respective N-modules 214.1-214.3 and the client computing systems 204.1-204.N, allowing storage 212.1-212.3 associated with the nodes 208.1-208.3 to be presented to the client computing systems 204.1-204.N as a single shared storage pool.

Each of the nodes 208.1-208.3 is defined as a computing system to provide application services to one or more of the client computing systems 204.1-204.N. The nodes 208.1-208.3 are interconnected by the switching fabric 210, which, for example, may be embodied as a Gigabit Ethernet switch or any other type of switching/connecting device.

Although FIG. 2 depicts an equal number (i.e., 3) the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative embodiments, the clustered storage system 202 may include a plurality of N-modules and a plurality of D-modules interconnected in a configuration that does not reflect a one-to-one correspondence between the N-modules and D-modules.

The client computing systems 204.1-204.N of Figure may be implemented as general-purpose computers configured to interact with the respective nodes 208.1-208.3 in accordance with a client/server model of information delivery. In the presently disclosed embodiment, the interaction between the client computing systems 204.1-204.N and the nodes 208.1-208.3 enable the provision of network data storage services.

Specifically, each client computing system 204.1, 204.N may request the services of one of the respective nodes 208.1, 208.2, 208.3, and that node may return the results of the services requested by the client computing system by exchanging packets over the computer network 206, which may be wire-based, optical fiber, wireless, or any other suitable combination thereof. The client computing systems 204.1-204.N may issue packets according to file-based access protocols, such as the NFS or CIFS protocol, when accessing information in the form of files and directories.

Figure 3:
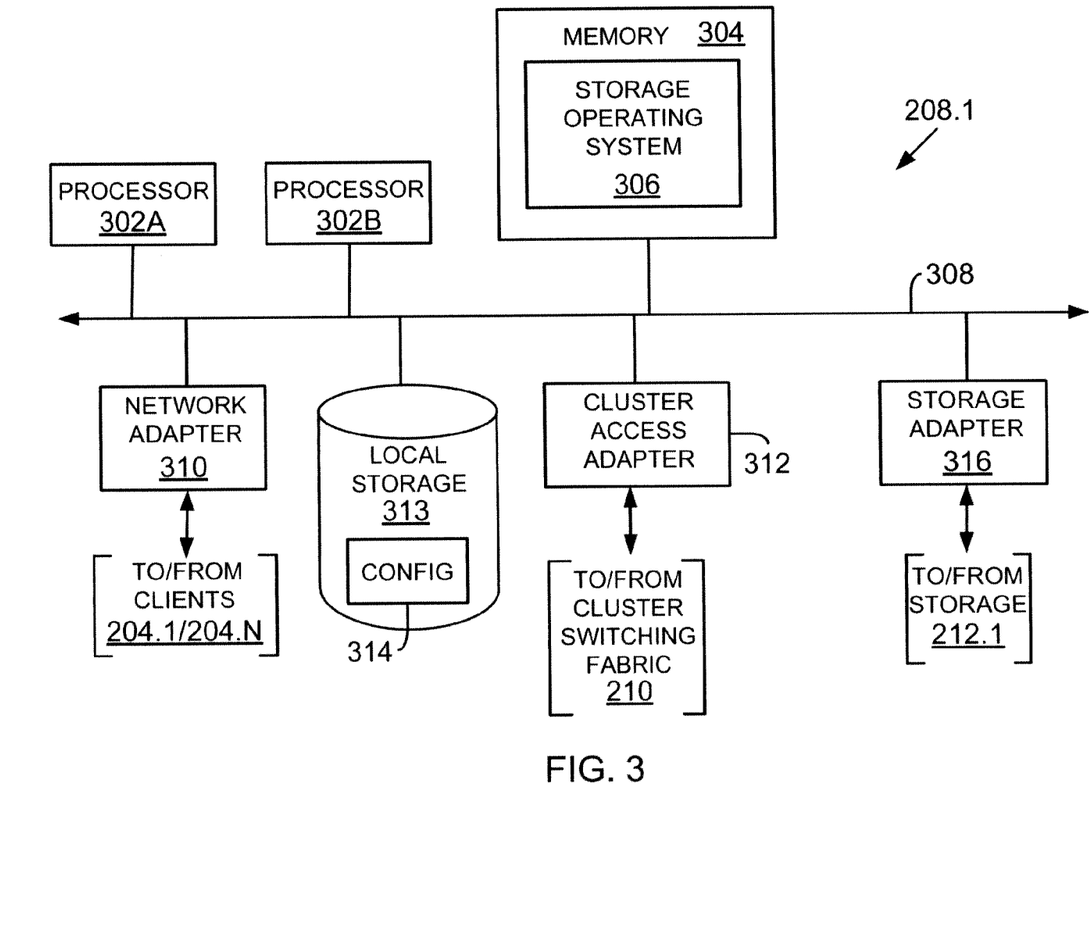
FIG. 3 shows an example of a node used in a cluster based storage system, according to one embodiment.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to provide information regarding various data object types to management console 102 for populating data structure 128.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314. As an example, configuration data structure 314 may include an ACL for storing information regarding clients that are permitted to access storage volumes. The ACL information is provided to management application 131 to populate access control data structure 128.

The cluster access adapter 312 comprises a plurality ports adapted to couple node 208.1 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network.

Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
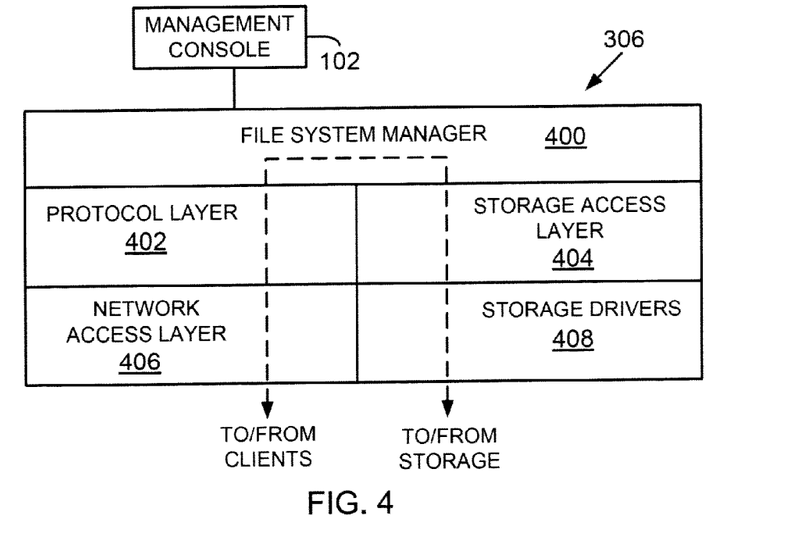
FIG. 4 shows an example of a storage operating system, used according to one embodiment.

Operating System:

FIG. 4 illustrates a generic example of storage operating system 306 (or 109, FIG. 1A) executed by node 208.1, according to one embodiment of the present disclosure. The storage operating system 306 maintains information regarding various storage devices, storage volumes, LUNs and aggregates and interfaces with management console 102 that maintains access data structure 128 for providing access to client computing systems.

In one example, storage operating system 306 may include several modules, or "layers" executed by one both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' 204.1/204.N and mass storage devices 212.1 are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 5:
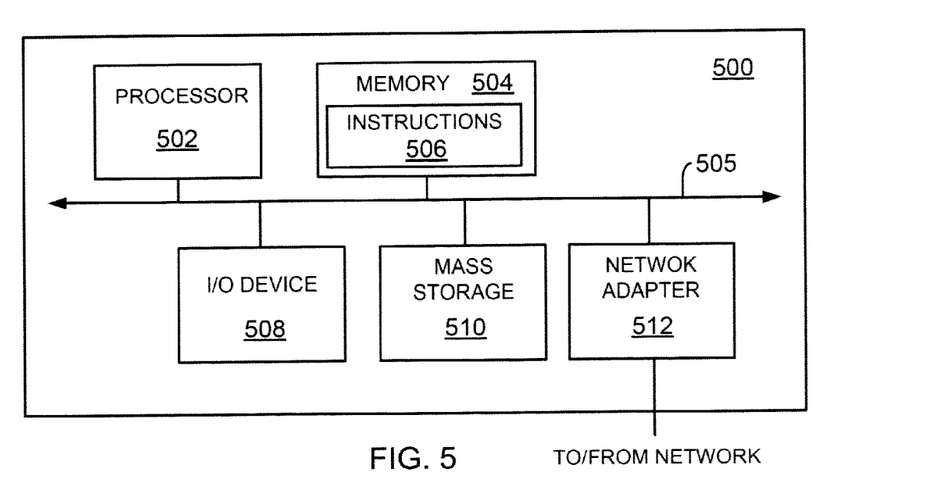
FIG. 5 shows an example of a computing system, used according to one embodiment.

Processing System:

FIG. 5 is a high-level block diagram showing an example of the architecture of a processing system 500 that may be used according to one embodiment. The processing system 500 can represent management console 102, clients 104, domain controller 105 or storage system 108. Note that certain standard and well-known components which are not germane to the present invention are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USE), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain embodiments, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implement the process steps described above with respect to FIGS. 1C and 1D may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The techniques described above are applicable in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments. The storage systems described above can be a part of the server layer for providing storage services.

Thus, a method and apparatus for accessing storage space managed by one or more storage systems have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure not limited to that described above. To the contrary, the disclosure is intended to cover various modifications and equivalent arrangements within the spirit and scope of the appended claims.

What is claimed is:

1. A machine implemented method, comprising:

maintaining an access control data structure at a cached memory of a management console, wherein the management console interfaces with a domain controller, a plurality of client computing systems, and a plurality of disparate storage systems, wherein the domain controller comprises a stand-alone authentication server, wherein the plurality of disparate storage systems manage storage devices and present storage space to the plurality of client computing systems;

receiving, by the management console, a request from a client computing system of the plurality of client computing systems to access a storage volume maintained by a storage system of the plurality of disparate storage systems or to obtain information regarding the storage volume;

using the access control data structure to determine if an identity of the client computing system has previously been validated, wherein the access control data structure stores storage system identifiers for identifying the plurality of disparate storage systems, an access object identifier for identifying a logical object that represents storage space that is managed by one of the plurality of disparate storage systems and presented to the client computing system, an identifier identifying each of the plurality of client systems, and a validity indicator indicating if the identity of the client computing system has previously been validated;

granting, by the management console, when the identity of the client computing system has previously been validated, the request using the access control data structure; and validating, when the identity of the client computing system has not been previously validated, the identity of the client computing system, wherein validation of the identity of the client computing system is performed by sending a request by the management console to the domain controller and receiving a response from the domain controller;

updating the access control data structure with validation results, after validating the identity of the client computing system, based, at least in part, on a response from the domain controller, wherein updating the access control data structure comprises storing an authentication credential for the client computing system in the access control data structure; and using the updated access control data structure for granting a future request from the client computing system.

2. The method of claim 1, wherein the domain controller uses a data structure to validate the identity of the client computing system.

3. The method of claim 1, wherein the management console executes a management application for maintaining the access control data structure.

4. The method of claim 1, wherein the management console executes an agent to interface with the plurality of storage systems, wherein the agent interfaces with the domain controller to validate the client computing system.

5. The method of claim 1, further comprising:

accepting unprompted validation updates from the domain controller; and updating the access control data structure based, at least in part, on the unprompted validation updates.

6. The method of claim 5, wherein the unprompted validation updates are based, at least in part, on changes made at the domain controller.

7. A non-transitory machine readable storage medium having stored thereon instructions, the instructions comprising machine executable code to:

maintain an access control data structure at a cached memory;

interface with a domain controller, a plurality of client computing systems, and a plurality of disparate storage systems, wherein the domain controller comprises a stand-alone authentication server, wherein the plurality of disparate storage systems manage storage devices and present storage space to the plurality of client computing systems;

receive, from a client computing system of the plurality of client computing systems, a request to access a storage volume maintained by a storage system of the plurality of disparate storage systems or to obtain information regarding the storage volume;

use the access control data structure to determine if an identity of the client computing system has previously been validated, wherein the access control data structure stores storage system identifiers for identifying the plurality of disparate storage systems, an access object identifier for identifying a logical object that represents storage space that is managed by one of the plurality of disparate storage systems and presented to the client computing system, an identifier identifying each of the plurality of client systems, and a validity indicator indicating if the identity of the client computing system has previously been validated:

grant, when the identity of the client computing system has been previously validated, the request using the access control data structure;

validate, when the identity of the client computing system has not been previously validated, the identity of the client computing system, wherein validation of the identity of the client computing system is performed by sending a request to the domain controller and receiving a response from the domain controller;

update, in response to validating the identity of the client computing system, the access control data structure with validation results based, at least in part, on a response from the domain controller, wherein updating the access control data structure comprises storing an authentication credential for the client computing system in the access control data structure; and use the updated access control data structure for granting a future request from the client computing system.

8. The machine readable storage medium of claim 7, wherein the domain controller uses a data structure to validate the identity of the client computing system.

9. The machine readable storage medium of claim 7, wherein the instructions further comprise machine executable code to execute a management application for maintaining the access control data structure.

10. The machine readable storage medium of claim 7, wherein the instructions further comprise machine executable code to execute an agent to interface with the plurality of storage systems, wherein the agent interfaces with the domain controller to validate the client computing system.

11. The machine readable storage medium of claim 7, wherein the instructions further comprise machine executable code to:

accept unprompted validation updates from the domain controller; and update the access control data structure based, at least in part, on the unprompted validation updates.

12. The machine readable storage medium of claim 11, wherein the unprompted validation updates are based, at least in part, on changes made at the domain controller.

13. A system comprising:

a hardware processor; and a machine readable storage medium having stored thereon instructions, which, when executed by the hardware processor, cause the system to, maintain an access control data structure at a cached memory;

interface with a domain controller, a plurality of client computing systems, and a plurality of disparate storage systems, wherein the domain controller comprises a stand-alone authentication server, wherein the plurality of storage systems manage storage devices and present storage space to the plurality of client computing systems;

receive, from a client computing system of the plurality of client computing systems, a request to access a storage volume maintained by a storage system of the plurality of storage systems or to obtain information regarding the storage volume;

use the access control data structure to determine if an identity of the client computing system has previously been validated, wherein the access control data structure stores storage system identifiers for identifying the plurality of storage systems, an access object identifier for identifying a logical object that represents storage space that is managed by one of the plurality of storage systems; and presented to the client computing system, an identifier identifying each of the plurality of client systems, and a validity indicator indicating if the identity of the client computing system has previously been validated;

grant, when the identity of the client computing system has been previously validated, the request using the access control data structure;

validate, when the identity of the client computing system has not been previously validated, the identity of the client computing system, wherein validation of the identity of the client computing system is performed by sending a request to the domain controller and receiving a response from the domain controller;

update, in response to validating the identity of the client computing system, the access control data structure with validation results based, at least in part, on a response from the domain controller, wherein updating the access control data structure comprises storing an authentication credential for the client computing system in the access control data structure; and use the updated access control data structure for granting a future request from the client computing system.

14. The system of claim 13, wherein the domain controller uses a data structure to validate the identity of the client computing system.

15. The system of claim 13, wherein the instructions comprise instructions which, when executed by the hardware processor, cause the system to execute a management application for maintaining the access control data structure.

16. The system of claim 13, wherein the instructions comprise instructions which, when executed by the hardware processor, cause the system to execute an agent to interface with the plurality of storage systems, wherein the agent interfaces with the domain controller to validate the client computing system.

17. The system of claim 13, wherein the instructions comprise instructions which, when executed by the hardware processor, cause the system to:

accept unprompted validation updates from the domain controller; and update the access control data structure based, at least in part, on the unprompted validation updates.

18. The system of claim 17, wherein the unprompted validation updates are based, at least in part, on changes made at the domain controller.

* * * * *